Figure 1:
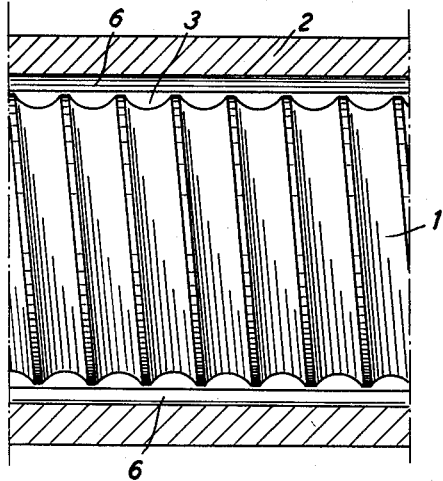

Sept. 29, 1964    J. J. G. DAUBENFELD    3,150,411
SCREW PRESSES, ESPECIALLY FOR WORKING PLASTICS
Filed April 1, 1963

Inventor

United States Patent Office 3,150,411
Patented Sept. 29, 1964

3,150,411
SCREW PRESSES, ESPECIALLY FOR
WORKING PLASTICS
Jean Joseph Gérard Daubenfeld, 12 Rue Astrid,
Luxembourg, Luxembourg
Filed Apr. 1, 1963, Ser. No. 269,277
Claims priority, application Germany Oct. 22, 1962
7 Claims. (Cl. 18—12)

The invention relates to a screw press, especially for working primarily thermoplastic synthetic substances, in which a worm is arranged in a cylinder and forces the crude material fed into the cylinder through the same, thereby working and plasticizing it before pressing it out of the cylinder through a mouthpiece.

It is known that the plasticized synthetic substance is only fed by a worm when the substance adheres to a certain extent to the cylinder wall surrounding the worm. If this is not the case, the synthetic substance merely follows the rotation of the worm. The adhesion of the synthetic substance to the inner wall of the cylinder results in that the layer in contact with the wall lags behind the layer in contact with the worm and as a consequence a desirable mixing and kneading effect is produced. It is necessary that the synthetic substance, while being worked in this manner, stays in the cylinder until it has been worked for a sufficiently long time. The synthetic substance must not, however, stick to the cylinder wall so firmly that this layer of material with retarded feed remains too long in the cylinder because this would lead to discoloration and burning of the synthetic substance with its objectionable results. To ensure the necessary adhesion of the synthetic substance on the cylinder wall with the desired effect and to obtain a sufficiently long dwell, that is working period, yet at the same time to prevent the layer of synthetic substance from remaining on the inner wall of the cylinder for an excessively long time, the screw presses hitherto known were equipped with worms with relatively steep pitch angle, about 30°, or of great length. The worm was in the order of magnitude of twenty to thirty times the external diameter of the worm. As the length of the worm determines the size of the entire press, these presses were relatively expensive.

Now the invention provides a relatively small worm pitch angle, mostly less than 10° and preferably between 4 and 5°, and in the surface of the inner wall of the cylinder cooperating with the worm groove or flute-like depressions intersecting the worm spiral or channel and extending substantially in the axial direction of the press or its worm. This enables the worm and consequently the press to be shortened considerably with the result that it is cheaper and more compact without being less efficient. Furthermore, the synthetic substance can be worked better. The grooves or flutes give the necessary hold on the cylinder wall while the slight pitch of the worm prevents the plastic mass from being held back too long in the cylinder by the grooves or flutes and in addition affords the plastic mass sufficient dwell in the cylinder which, in spite of shorter construction, can be just as long as in a known press with long worm.

The flutes or grooves can also be in oblique direction to the axis of the worm. They can also have a slightly helical course.

The worm itself preferably has, according to the invention, a spiral or channel cross-section in the shape of a segment.

Hitherto the worm had a trapezium shaped spiral or channel cross-section only one arm of which supplied a bundle of forces which pressed the plastic mass against the inner wall of the cylinder. By giving the spiral or channel the cross-sectional shape according to the invention, a larger concentration of forces is produced for pressing the mass against the inner wall of the cylinder. At the same time a better slip of the plasticized synthetic substance in the worm channel is obtained because the synthetic substance rolls in the worm channel under the retarding adhesive action on the cylinder wall.

It is advisable to give the grooves and flutes a streamlined, substantially semi tear-shaped cross section with the point away from the direction of rotation. Such a cross-section favours the desired kneading and mixing of the mass because, particularly in combination with a worm channel of circular segmental cross-section, it imparts to the mass a whirling motion which is of different strength in the different layers and thus causes thorough mixing and kneading.

The back-currents occurring as a result of the building-up of pressure by the shaping tool fitted on the press, may, according to the invention, be caught or taken up by interrupting the flutes or grooves along a stretch of the cylinder and providing within this interrupted stretch an interruption in the worm channel, for which latter a chamber-like cavity in the body of the worm is substituted. This cavity forms a pressure chamber which checks the back-flow of the plasticized synthetic substance. It is arranged in the plasticizing zone, that is in the zone in which the synthetic substance is in the first stage of plasticization. A strong pressure is exerted on the plasticized synthetic substance from the draw-in zone and counteracts the back-flow.

It is evident that the invention can also be applied to presses with stationary core and rotary cylinder provided with worm thread, such as those forming the subject matter of the German patent application D 39,260 X/39a$^4$.

The concentration of the plastic mass while being worked in the press can, if necessary, be taken into consideration, for example by reducing the depth of the thread of the worm and/or of the recesses or flutes or grooves.

Figure 2:
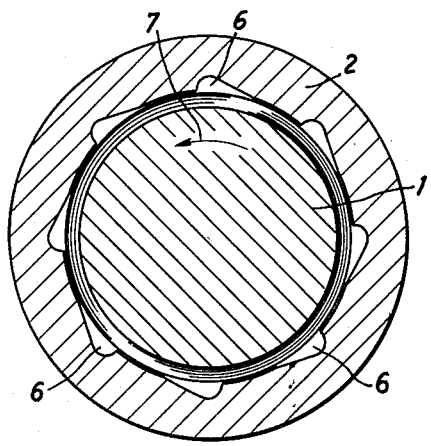

An embodiment of the invention is illustrated by way of example in the accompanying drawing, which is confined to the parts necessary for explaining the invention. In the drawing FIG. 1 is a part longitudinal section of the press cylinder and the worm;

FIG. 2 a cross-section through the cylinder and worm, and

Figure 3:
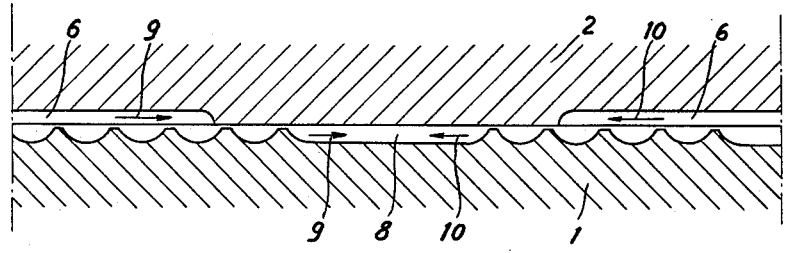

FIG. 3 a diagram showing the arrangement of a pressure chamber.

The worm is designated by 1 and the cylinder by 2. The worm has a pitch angle of 4 to 5°. Its thread 3 is of circular segmental cross-section. In the inner wall of the cylinder grooves or flutes 6 are uniformly distributed over the periphery and, in the embodiment illustrated, extend parallel to the axis of the worm.

The grooves or flutes have a streamlined cross-section which is about the shape of a half tear-drop with its point directed away from the direction of rotation. The direction of rotation is indicated by the arrow 7 in FIG. 2. It is evident that the invention is not restricted to the half tear-drop shaped cross-section of the grooves and flutes but covers other or similar cross-sectional shapes which attain the desired purpose.

As can be seen from FIG. 3, the grooves or flutes 6 are interrupted along a stretch. Within this interrupted stretch the worm thread is also interrupted and replaced by a cavity 8 which acts as pressure chamber. The feed pressure of the plasticized plastic mass is indicated by the arrows 9 and the counterpressure by the arrows 10.

What I claim is:

1. An extrusion screw press comprising in combination cylindrical casing means having an inner wall,
a plurality of grooves in the inner wall of said casing means and extending substantially axially of said casing means, press screw means received in said casing means and having threads forming a screw channel, a non-grooved portion on said casing inner wall intermediate the ends of said casing means, and an interruption of said screw threads opposite said non-grooved portion of said casing inner wall providing a peripheral recess in the surface of said press screw.

2. An extrusion screw press according to claim 1 wherein the pitch angle of said threads is less than 10°.

3. An extrusion screw press according to claim 2 wherein said grooves have a substantially half tear-drop cross-section in the direction of rotation of said press screw.

4. An extrusion screw press according to claim 1 wherein said screw channel has a cross-section of segmental circular shape.

5. An extrusion screw press according to claim 1 wherein said grooves extend at an incline to the axis of the press screw.

6. An extrusion screw press according to claim 1 wherein said grooves extend in a slightly helical course.

7. An extrusion screw press comprising in combination a cylindrical casing having an inner wall, a plurality of grooves in the inner wall of said casing and extending substantially axially of said casing, a press screw received in said casing and having threads forming a screw channel, a non-grooved portion on said casing inner wall intermediate the ends of said casing, and an interruption in said screw threads opposite said non-grooved portion of said casing wall, said interruption having an axial length of at least two adjacent threads providing a peripheral recess having its base on the level of the root of said screw channel.

References Cited in the file of this patent
UNITED STATES PATENTS

| | | |
|---|---|---|
| 2,367,394 | Griffiths | Jan. 16, 1945 |
| 3,065,502 | Lorenian | Nov. 27, 1962 |